(12) United States Patent
Hemmings (10) Patent No.: US 7,315,312 B2
(45) Date of Patent: Jan. 1, 2008

(54) 3D PUBLICATION WITH PAGE-TURN

(76) Inventor: Chris Hemmings, 9A Seabird Lane, Discovery Bay, Hong Kong (HK)

(*) Notice: Subject to any disclaimer, the term of this patent is extended or adjusted under 35 U.S.C. 154(b) by 825 days.

(21) Appl. No.: 10/660,114

(22) Filed: Sep. 5, 2003

(65) Prior Publication Data
US 2005/0066288 A1 Mar. 24, 2005

(51) Int. Cl.
G06T 15/00 (2006.01)

(52) U.S. Cl. .................. 345/649; 715/525; 715/910
(58) Field of Classification Search ............ 715/525, 715/910; 345/649
See application file for complete search history.

(56) References Cited

U.S. PATENT DOCUMENTS

| 7,081,882 B2 * | 7/2006 | Sowden et al. ............ 345/156 |
| 7,171,630 B2 * | 1/2007 | O'Leary et al. ............ 715/856 |

* cited by examiner

Primary Examiner—Almis R. Jankus
(74) Attorney, Agent, or Firm—Jacobson Holman PLLC (57) ABSTRACT

This invention provides a realistic 3-dimensional graphical representation of a publication on a display means such as a computer monitor or virtual reality goggles in which the publication includes a smooth fluid page-turn. The user interface to provide the publication on the display allows a user to request a subsequent page and produce a sequence of animated frames of the publication with the page progressively turned and recalculates the rotation of the page with respect to the publication and the orientation of the publication with respect to the user for each frame. In this manner the user can move around the publication in 3D space while the page is turning and still obtain an accurate view of the publication from each new angle assumed by the user.

22 Claims, 7 Drawing Sheets

Start
Initiate High Precision Timer (0 to pi/12)
Set Windows into a Screen Refresh loop
Flag a Windows *memory* device-context for immediate repainting Each Frame
Windows calls for the *memory* device-context image in its repaint list
Interupt Windows
Get Elapsed Time in Radians
Calculate Ellipse Arc Bezier *Control Points* (uses constant) at both ends of page
Rotate the 2 sets of four xyz points to desire orientation
Translate to 2D (xy points)
Draw page turning page edges as Cubic Bezier Curves
Draw the page in lines from a mapped page in memory
Anti-alias for smooth joins and edges
Resume Windows and pass it this image via the *memory* device-context
Windows paints normally
Windows loops to the next Screen Refresh End
Elapsed Time reaches Pi/2
Refresh Page
Free the Windows *memory* device-context
Release Windows Refresh Loop

FIG 12

3D PUBLICATION WITH PAGE-TURN

FIELD OF THE INVENTION

This invention relates to a provision of 3-dimensional graphical representation of a publication in the form of a book or similar that can also incorporate a realistic turning page.

BACKGROUND TO THE INVENTION

From the commencement of wide spread availability to personal computers, people have endeavoured to provide information on the personal computer to a user in a variety of different manners.

In the case of publications, perhaps the most widely use currently is the Internet browser which allows the display of information from the sources to which the user links. The difficulty with browser technology is that the viewable page is dictated by both the browser and the personal settings of the user as well as the document available for viewing. Typically documents extend beyond an initial page and the use of scroll bars or similar provides access to the remaining document.

In the case of publications which may carry advertising, browser technology has often proved awkward with only limited space available for useful advertising. For example, banner advertising across the top of a browser page is often used. Nevertheless, an advertisement at the foot of a document provided across browser may not be particularly valuable as not all users progressing into a document will scroll to the completion of that document and ever bring such an advertisement interview. The ability of a publisher to dictate how the page is viewed by a user is complicated by the user's own settings in the browser.

For this reason, other forms of electronic publication to provide different interfaces between the user and the document had been provided. Examples include a Dolby Acrobat and other such formatted programs for viewing publications.

In more recent times, publications have been constructed and include a page-turn such that the entire publication is viewable as intended by the publisher on the screen and the page-turn allows a user to move through the document much as they would a book, magazine or similar traditional print media publication. An example of this technology is provided in international patent application No. PCT/IB01/01621 in which a 2-dimensional publication is provided with a page-turn with the turning page given some 3-dimensional element to the publication. The turning page arises from the publication as represented on the screen such that the outer edge of the page is turned towards the viewer and the outer edge stretches as it approaches the viewer to simulate a typical perspective view a viewer would have of a real publication.

Although this electronic publication provides a page-turn and is a useful interface for viewing publications in the current environment, it does not provide a genuine 3-dimensional representation of the publication which is viewable from all angles. This presents a further series of challenges in both stimulating the publication in 3-dimensional space and in providing accuracy and realism to a page-turn regardless of the angle from which it is viewed.

OBJECT OF THE INVENTION

It is an object of the present invention to provide an electronic publication, a user interface and a method of providing a user interface to represent a publication in 3-dimensional space with the inclusion of a page-turn that will overcome the disadvantages of the prior art or at least provide the public with a useful choice.

SUMMARY OF THE INVENTION

Accordingly, in a first aspect, the invention may broadly be said to consist in a method of providing a user interface including a 2-dimensional representation of a 3-dimensional multiple-page document having a page-turn comprising:
  displaying said multiple-page document on a 2-dimensional display to a user;
  detecting a request from a user for a subsequent page from said multiple-page document;
  displaying an animated sequence of frames throughout the transition between said first and subsequent pages to create a page-turn; and
  wherein said publication is redrawn to accommodate any change in orientation by the user intermediate of frames in said animated sequence.

Accordingly in a second aspect the invention may broadly be said to consist in a method of displaying an animation frame of a publication with a partially turned page on a display means comprising the steps of:
  determining the rotation of the partially turned page with respect to a reference point for the publication;
  characterising the publication and the partially turned page with characteristic points referenced to a point of rotation;
  orientating the characteristic points about the point of rotation with reference to the position of a user;
  translating the rotated characteristic points to the display means; and
  drawing the frame of the animation of the publication with reference to the translated rotated characteristic points.

Accordingly in a third aspect the invention may broadly be said to consist in a user interface including a 2-dimensional representation of a 3-dimensional multiple-page document having a page-turn comprising:
  a 2-dimensional display for displaying said multiple-page document to a user;
  means for detecting a request from a user for a subsequent page from said multiple-page document;
  means for calculating an animated sequence of frames throughout the transition between said first and subsequent pages to create a page-turn; and
  wherein said means for calculating a frame of said animation accommodates any change in orientation by the user intermediate of frames in said animated sequence.

Accordingly in a fourth aspect the invention may be broadly said to consist in a user interface for displaying an animation frame of a publication with a partially turned page on a display means comprising;
  means for determining the rotation of the partially turned page with respect to a reference point for the publication;
  means for characterising the publication and the partially turned page with characteristic points referenced to a point of rotation;
  means for orientating the characteristic points about the point of rotation with reference to the position of a user;
  means translating the rotated characteristic points to the display means; and means for drawing the frame of the animation of the publication with reference to the translated rotated characteristic points.

Accordingly in a fifth aspect the invention may broadly be said to consist in a computer readable medium encoded with a computer program to provide a user interface including a 2-dimensional representation of a 3-dimensional multiple-page document having a page-turn, wherein said user interface comprises:

a 2-dimensional display for displaying said multiple-page document to a user;

means for detecting a request from a user for a subsequent page from said multiple-page document;

means for calculating an animated sequence of frames throughout the transition between said first and subsequent pages to create a page-turn; and wherein said means for calculating a frame of said animation accommodates any change in orientation by the user intermediate of frames in said animated sequence.

Accordingly in a sixth aspect the invention may broadly be said to consist in a computer readable medium encoded with a computer program to provide a user interface for displaying an animation frame of a publication with a partially tuned page on a display means comprising:

means for determining the rotation of the partially turned page with respect to a reference point for the publication;

means for characterising the publication and the partially turned page with characteristic points referenced to a point of rotation;

means for orientating the characteristic points about the point of rotation with reference to the position of a user;

means translating the rotated characteristic points to the display means; and means for drawing the frame of the animation of the publication with reference to the translated rotated characteristic points.

Accordingly, in a seventh aspect, the invention may broadly be said to consist in computer software program to provide the user interface as previously defined.

BRIEF DESCRIPTION OF THE DRAWINGS

The present invention will now be described with reference to the following drawings in which.

DETAILED DESCRIPTION OF PREFERRED EMBODIMENTS

This present invention concerns the electronic representation of a publication 1 in a 3-dimensional space. Such a publication may be provided on a computer screen monitor, 3-dimensional virtual reality goggles or similar such devices.

Figure 1A:
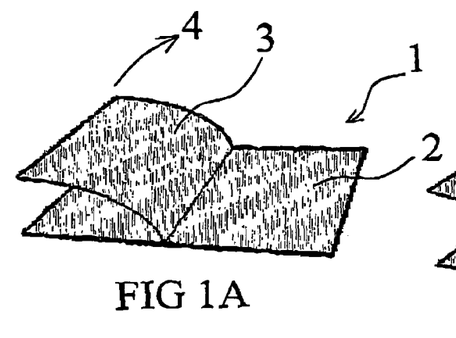
FIGS. 1A to 1D show representations of a publication from different orientations and that different stages of a page-turn sequence in accordance with one embodiment of the invention.
Figure 1B:
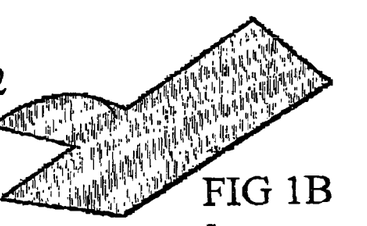
Figure 1C:
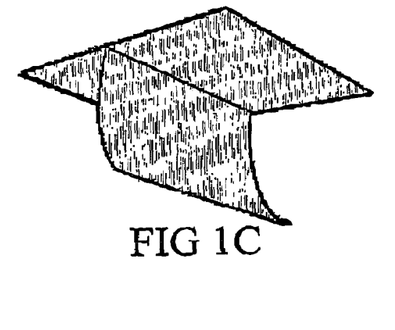
Figure 1D:
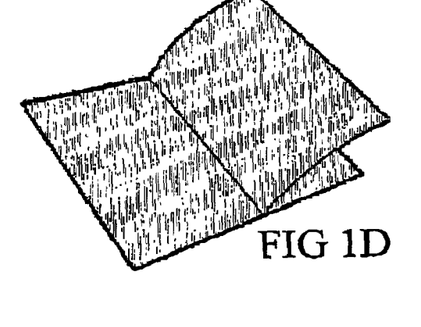

The intention of the present invention is to provide a publication that can be viewed in 3-dimensional space such as may be used in a virtual reality setting whereby a user may be able to view the publication from any orientation. As shown in FIG. 1A, the publication 1 may comprise a plurality of pages 3 containing text, graphics or other material 2. Additionally, the present invention provides rotation 4 of a turning page so as to endeavour a realistic page-turn to the multi-page document.

As shown in FIGS. 1A through to 1D, the publication and the turning page 4 can assume a variety of different orientations depending on the orientation in which the publication is viewed as well as the particular position of the turning page during an animated sequence that constructs a complete page-turn. The turning page 4 may lift from a publication and rotate to an opposed side of the publication in the same manner as the movement of pages of a book. However, to provide such a page-turn in 3-dimensional space, both the orientation of the publication itself and the relative representation of the turning page need to be considered.

Figure 2:
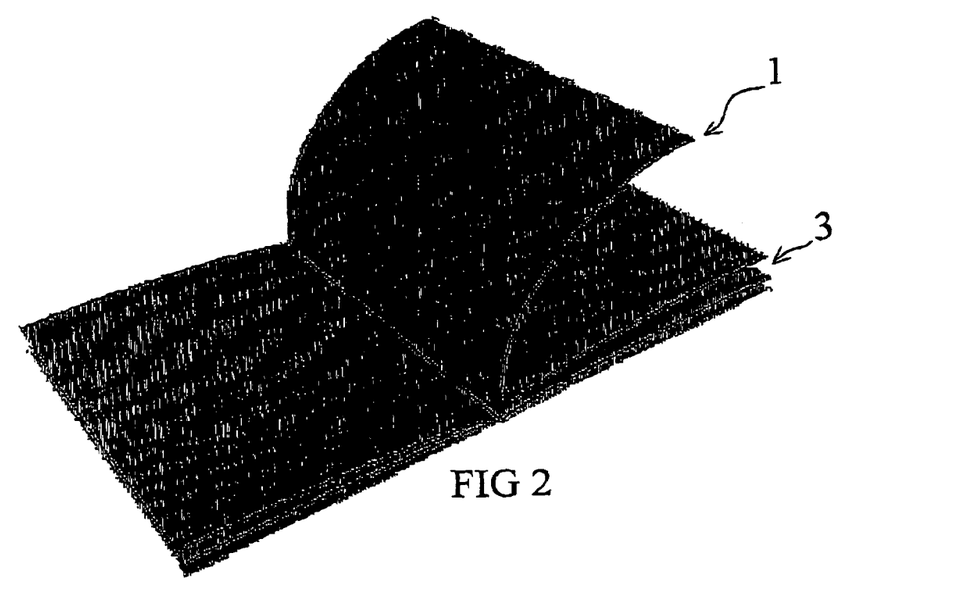
FIG. 2 is a perspective representation of a publication as may be viewed on a screen in accordance with a further embodiment of the invention.
Figure 3A:
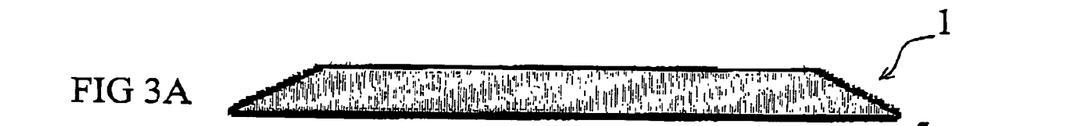
FIGS. 3A to 3E show selected frames from a sequence of animations of a page-turn of a 3-dimensional representation of a publication in accordance with a preferred embodiment of the invention.
Figure 3B:
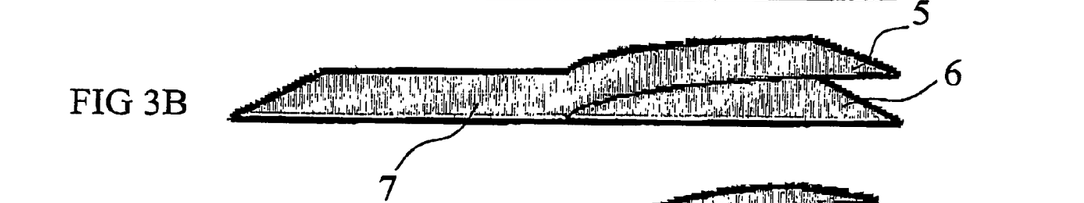
Figure 3C:
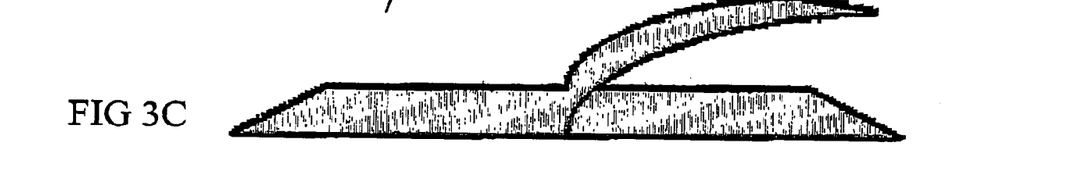
Figure 3D:
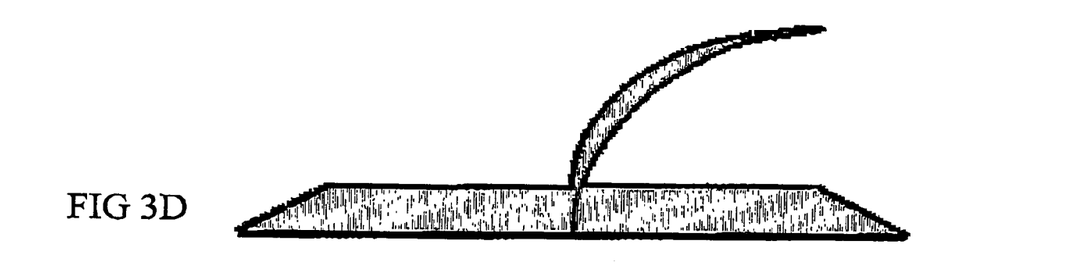
Figure 3E:
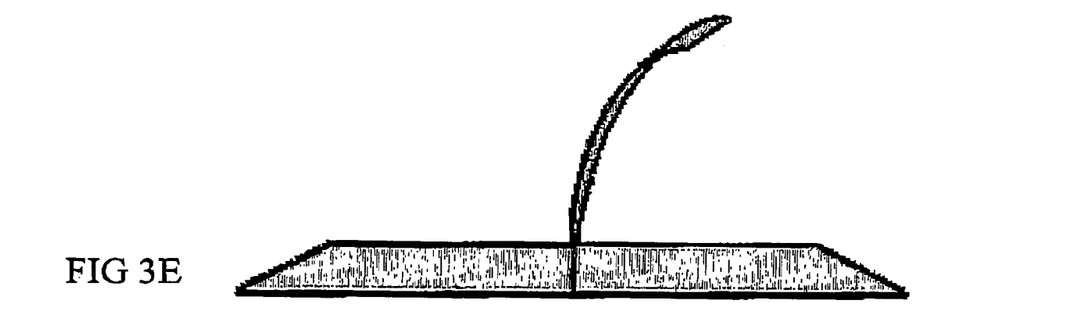

Referring to FIG. 2, the publication 1 can comprise a large number of pages 3 with the remaining pages intended to line substantially planar to the base to again simulate the typical pages of a book.

Referring to FIGS. 3A to 3E, a series of specific frames from a page-turn animation are shown through FIGS. 3A to 3E. It can be seen that the publication 1 may commence in FIG. 3A as a substantially planar document. Upon activation of any suitable control so as to commence the page-turn sequence such as tapping or clicking a cursor on a page the page 5 may begin to lift from a revealing page 6 at the commencement of its rotation towards a facing page 7.

It should be appreciated that FIGS. 3A to 3E only show five frames from an animated sequence that may contain a large number of frames so as to make the animation smooth and substantially continuous. Furthermore, to improve the accuracy of the animation sequence, the preferred form of this invention calculates the position of the turning page 5 for each frame in terms of the elapsed time since the commencement of the page-turn animation. This may be performed by utilizing a high-resolution timer in the computer and recalculating the page position according to elapsed time. The page-turn sequence preferably allows a user to control the total time for the page-turn sequence as a preferential control.

The use of a timer and calculation of the position of the page in terms of elapsed time ensures that the page-turn sequence may be substantially similar on machines of different processing speed and will not slow down or speed up according to instantaneous demands on the processor of the computer concerned. The position of the turning page is made independent of the processor speed and the variable is the number of frames that will be able to be produced in the entire sequence with slower processors producing less frames during the total elapsed time. Nevertheless, provided the page-turn is configured to generate sufficient frames on a relatively slow processor, there would be little visual difference between slow and faster processor machines.

The construction of the page-turn in 3-dimensional space in this preferred form of the invention not only provide a rotating page but seeks to provide some natural curvature to the turning page so that it more closely approximates an elliptical shaped page. The use of such an elliptical edge to the turning page provides a smoother transition to the centre line about which it turns and to the page as it leaves and lands on the revealing and facing pages respectively.

Figure 4:
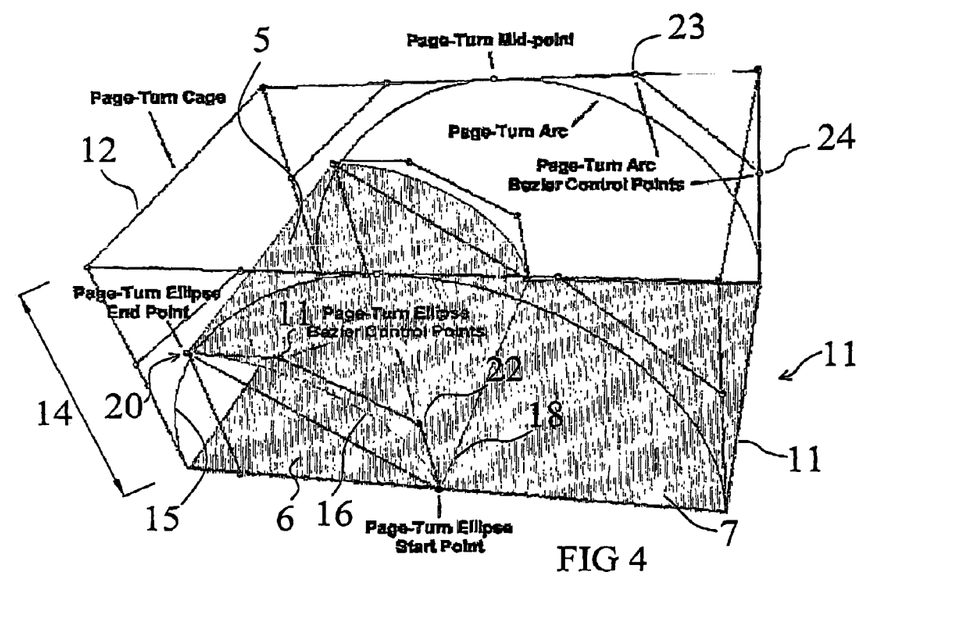
FIG. 4 shows a perspective view of the construction of a partially turned page in a 3-dimensional publication in accordance with the preferred embodiment of the invention.
Figure 5:
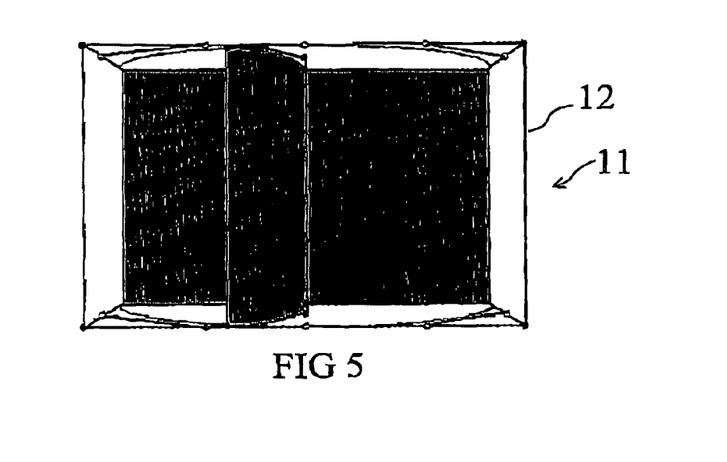
FIG. 5 shows a further orientation of the publication of FIG. 4.

As shown in FIG. 4, the preferred invention commences with the orientation of the publication 1 having been determined due to the position in the virtual 3-D space. Typically, the position of the publication 1 in the 3-dimensional space is controlled by the user as the user moves through or re-orientates the virtual space or their position within the space. Such controls are already known to those skilled in the art.

The preferred form of the invention constructs the publication 1 in terms of a plane 11 formed from the revealing page 6 and facing page 7 or some other such plane through the publication. The limits of the space through which the publication may move or the turning page 5 may move can be determined by constructing a page-turn cage 12. The page-turn cage is essentially the box bounded by the outer parameter of the publication 1 being the plane 11 and extended out from the publication to a height 14 corresponding to the width of the turning page 5.

The outer corners of the turning page 5 are resumed to progress along a page-turn arc 15 being substantially a semi-circular path on opposed sides of the page-turn cage 12. The edge 16 of the turning page 5 is provided in an elliptical shape that may be described by bezier control points. It will be noted that any curve can be defined in terms of one or more bezier control points together with a start and end point. The start and end point of the ellipse 16 are defined by the start point being the centre line 18 and the end point being on the page-turn arc 15 and determined by the amount of time elapsed and on the assumption that the page is undergoing substantially constant rotation throughout the total time required to complete the page-turn.

The bezier control points for the ellipse 16 are described subsequently although it should be noted that these are preferably provided by two bezier control points although can also possibly be defined in terms of a single bezier control point intermediate of the start and end points.

In constructing the full page-turn cage, the outer cage 12 is constructed based on the dimensions of the page. The page-turn arc may then be constructed on opposed sides as a semi-circular arc and also represents the proportional time limit for the whole page-turn sequence. For example, after 30% of the expected elapsed time for the entire sequence, the page-turn elapsed end point 20 would be 30% along the length of the page-turn arc.

The time line equation maybe as follows:

time-line=0 to $\pi/2$

Once the elapsed time is determined, the page-turn elapsed end point 20 is determined and the page-turn elapsed start point is already known and taken as the spine of the publication. These two points provide the semi-major and semi-minor axes of an ellipse, ¼ of which forms the elliptical edge 16 of the turning page. The bezier control points 21 and 22 may then be determined.

The box in which the turning page is to be drawn for any particular frame can be see to be defined by:

page-turn box= sin φ page-width cos φ page-width

All of these particular points can be determined as specific points in the page-turn cage and, for the time being, can be independent of the orientation of the viewer in viewing the cage. If it is then desired to consider the orientation of the page, the basic orientation in relation to the cage itself may be determined and all the various control points can be rotated in 3-D space by rotation of the control points being the outer corners of the cage and the bezier control points for the page-turn arc and the page-turn ellipse. The advantage of this method is that there is no necessity to try and calculate rotation of the edge of the page or the curves themselves but instead only those control points. Rotation of specific points in a 3-D space can be performed to then provide correct orientation in 3-D space.

It can be seen that the page-turn arc 15 may be provided with its own bezier control points 23 and 24 so as to also allow its orientation to be determined in 3-D space and rotated as desired.

FIG. 2 shows a plane view of the control points and the page-turn cage which correspond to the manner in which prior art 2-dimensional page-turn applications may show the publication.

Figure 6:
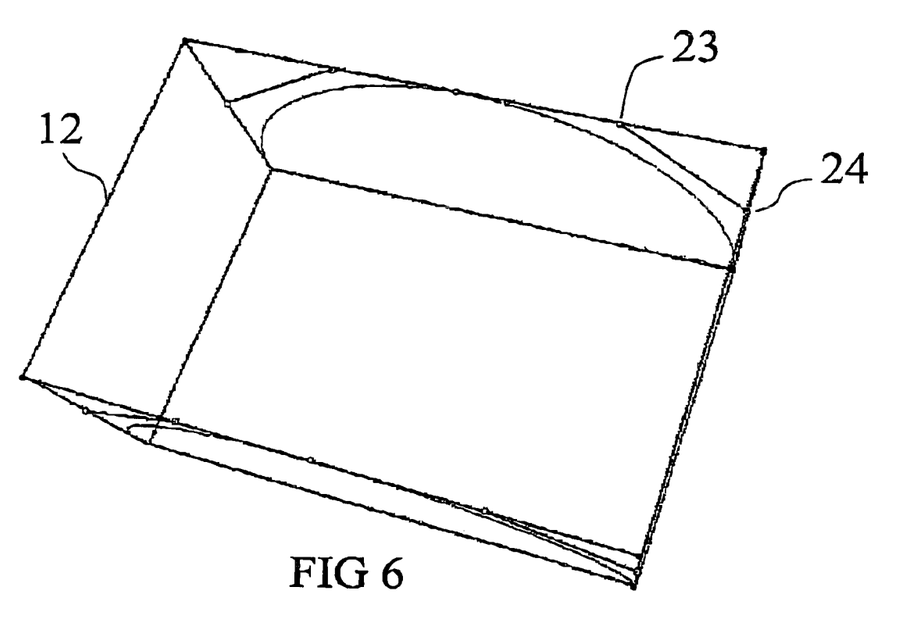
FIG. 6 shows a perspective view of the control points for calculating and constructing the page-turn arc.

Referring to FIG. 6, the publication itself is removed to show only the cage and the control points for greater clarify.

Figure 7:
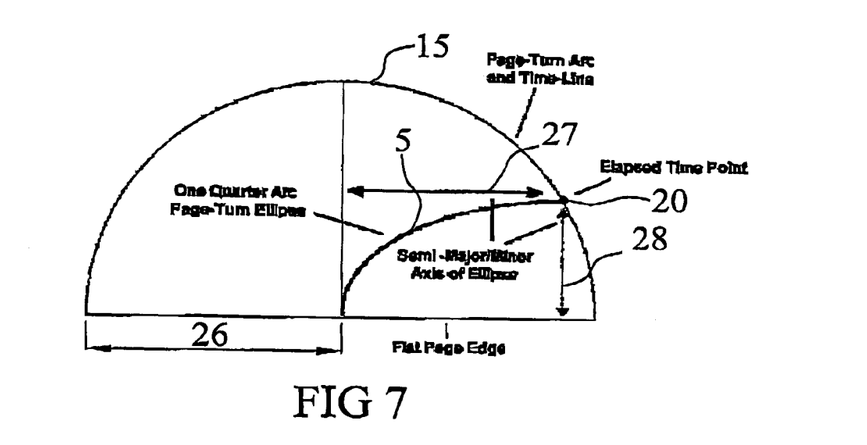
FIG. 7 shows the edge of a page in cross section and its construction for the page-turn sequence.

Referring to FIG. 7, the geometry of the page-turn is shown in cross section in respect of a publication lining flat and showing the edge of the turning page 5 alone.

The page-turn arc and time line 15 is determined by the total page width 26. Assuming constant rotation of the page, the page-turn end point 20 corresponds to the elapsed time point as time progresses constantly around the page-turn arc. The semi-major axis of the ellipse of which the turning page forms ¼ is shown as 27 in FIG. 7 and the semi-minor axis as 28. The actual values for the semi-major and minor axes may be determined by determining the elapsed time, calculating the degree of rotation in radians and using sin and cos functions of the angular rotation times the page width 26 to determine the values for 27 and 28.

Figure 8:
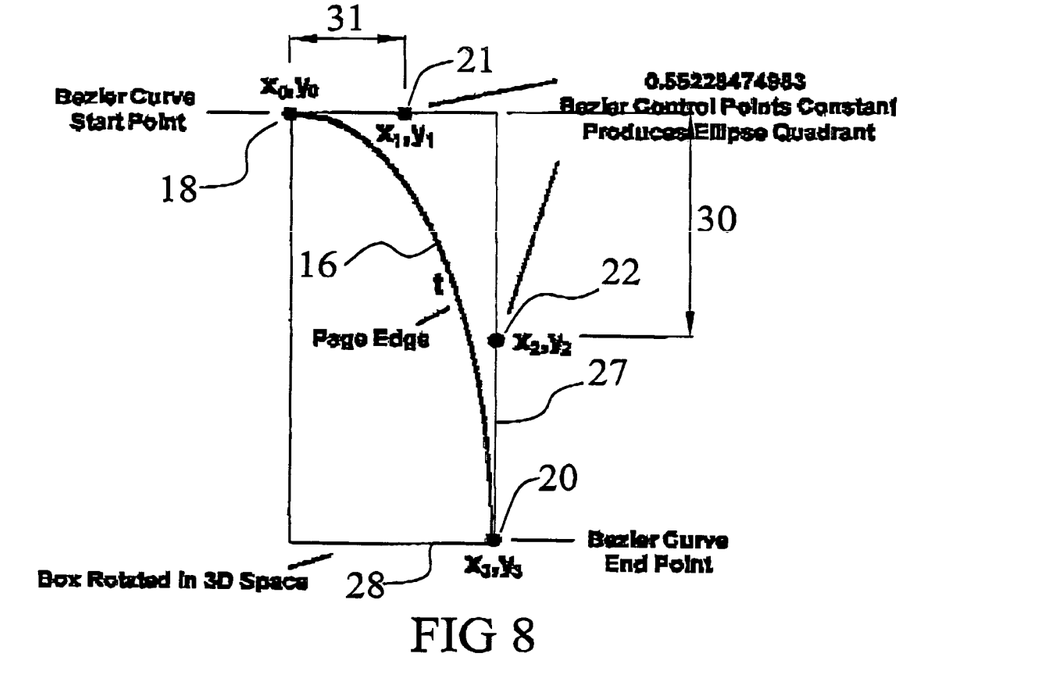
FIG. 8 shows the construction of the edge of the page and the critical points to be rotated in 3-dimensional space in accordance with a preferred form of the invention.

To then construct the edge of the page as shown in FIG. 8, it needs to be appreciated that the ¼ arc ellipse that represents the edge of the page 16 in this preferred embodiment can be defined in terms of the start point which corresponds to the spine of the publication 18, the end point 20 as defined by the progression of the page around the page-turn arc and bezier control points 21 and 22. This provides a cubic bezier curve to represent the ellipse. The bezier control points 21 and 22 have been determined to correspond to a constant distance along the semi-major and semi-minor elliptic axes 27 and 28. The particular constant utilized in this preferred embodiment of the invention is 0.55228474983. Of course, it will be appreciated that other representations could be used for the curve to provide a slightly different page edge.

Once the four x and y points are determined being points 18, 20, 21 and 22, a cubic bezier curve can be used to plot the page edge and the advantage of bezier curve points is that it is possible to rotate the bezier control points in 3-D space as well as translating the points to a 2-dimensional screen to rotate the curve to any orientation determined by the user. In other words, all that is required to plot the page edge of the tuning page is the position of the bezier control points according to the turn of the page in respect of time and then the orientation of those points in the 3-dimensional space according to the orientation determined by the users movements or selection.

The specific cubic bezier curve equation is as follows:

$$x=x_0(1-t)^3+3x_1t(1-t)^2+3x_2t^2(1-t)+x_3t^3$$

$$y=y_0(1-t)^3+3y_1t(1-t)^2+3y_2t^2(1-t)+y_3t^3$$

This cubic bezier curve equation plus the correct page edge where the start point 18 provides the values for $x_0$ and $y_0$, the end point 20 provides the points $x_3$ $y_3$ and the bezier control points for the elliptic quadrant 21 and 22 provide the values for x1, y1, x2 and y2.

The value of "t" in the previous equation is a value between 0 and 1 as a progression along the elliptical curve.

Once the cage has been constructed in the form of FIG. 4 including all the control points for the curvature of the turning page and the control points for the page-turn arc 15, the entire page together with the control points can be rotated to the orientation of the user at that instant.

Figure 9:
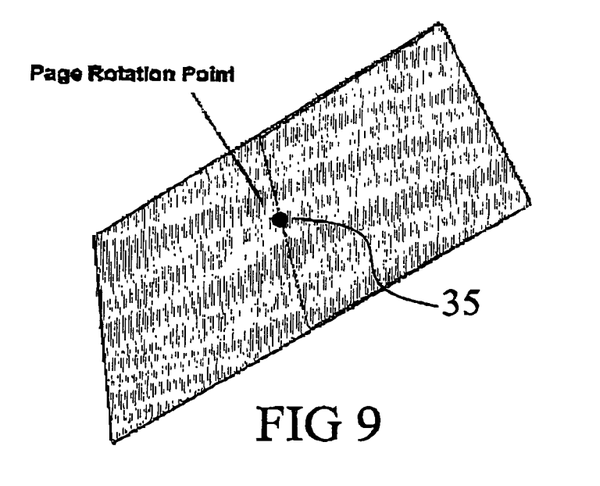
FIG. 9 shows the rotation point of the base of the publication from which the turning page is constructed.

It will be appreciated that in any 3-dimensional representation of the publication, the x and y points of the edge of the page as defined previously are done in terms of x and y points on the side face of the publication cage 12 as defined in 3-dimensional space. The entire cage is an orientated about a point of rotation on, in or in reference to the page-turn cage 12. For convenience in this preferred example, the page rotation point is taken as the central point of the substantially planar revealing and facing pages 7 being the point 35 as shown in FIG. 9.

The page-turn cage in terms of its critical points including the bezier control points for the page-turn arc and the particular curvature of the page at that instant are rotated to their new 3-dimensional orientations by the following equation:

$$R_x(\theta) = \begin{bmatrix} 1 & 0 & 0 & 0 \\ 0 & \cos(\theta) & -\sin(\theta) & 0 \\ 0 & \sin(\theta) & \cos(\theta) & 0 \\ 0 & 0 & 0 & 1 \end{bmatrix}$$

$$R_y(\theta) = \begin{bmatrix} \cos(\theta) & 0 & \sin(\theta) & 0 \\ 0 & 1 & 0 & 0 \\ -\sin(\theta) & 0 & \cos(\theta) & 0 \\ 0 & 0 & 0 & 1 \end{bmatrix} \quad R_z(\theta) = \begin{bmatrix} \cos(\theta) & -\sin(\theta) & 0 & 0 \\ \sin(\theta) & \cos(\theta) & 1 & 0 \\ 0 & 0 & 0 & 0 \\ 0 & 0 & 0 & 1 \end{bmatrix}$$

These points then need to be translated back to the 2-dimensional screen of the computer monitor or virtual reality goggles or similar. Prior to this point, the said component of the 3-dimensional point and space is merely a positive or minus value around the centre of rotation. To then translate the image back to a 2-D screen, it is necessary to include a value relating to camera distance from the centre of rotation which equates to the zoom or distance to the publication in the 3-dimensional space. It will be appreciated that this may not be an absolute value but instead is merely a proportional value. The following equation is used to translate the points to the 2-dimensional screen:

$$ScreenX=((cx)/(c-z))+HorRes/2$$

$$ScreenY=VertRs/2-((cy)/(c-z))$$

In this equation, c equates to the camera distance from the centre of rotation and horres and vertres are the corresponding horizontal and vertical screen resolutions of the monitor or similar display.

This has completed the drawing of the frame of the page-turn to the screen.

Following the drawing of the page and the bezier control points to the screen, the actual lines outlining the publication can be filled in in terms of the facing and revealing pages 6 and 7 and the turning page 5.

Figure 10:
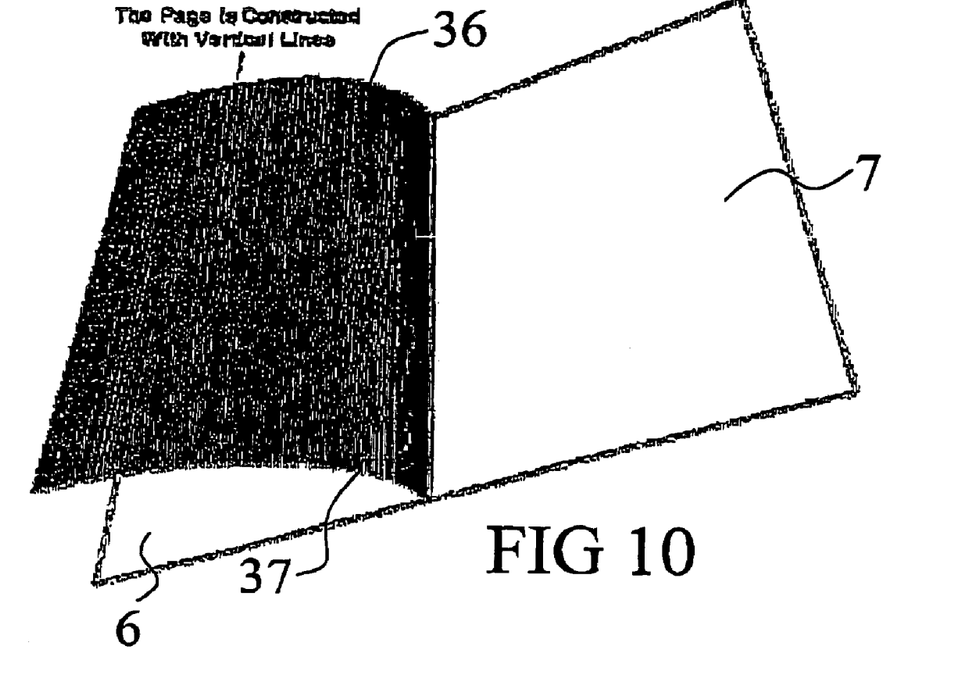
FIG. 10 shows a screen view of a partially turned page being reconstructed in its new orientation.

To lay out the text or images onto the turning page, it will be appreciated that rotation of the page-turn cage together with the bezier control points for the elliptic curves of the turning page allow the edges 36 and 37 of the page to be plotted and the page itself may be constructed by taking information from an origin page being a representation of the text or images on the page 5 when lining flat and plotting these onto the page.

The actual plotting of these lines will be explained in further detail subsequently in terms of the overall program processing.

Figure 11:
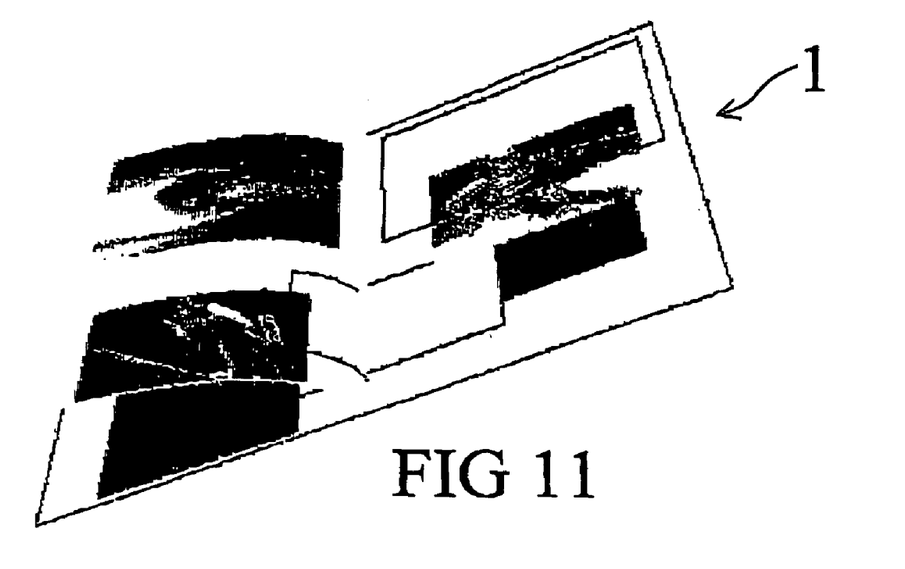
FIG. 11 shows a complete publication with graphical matter on the pages in a partially turned orientation.

A publication including video images, still pictures and text may be constructed with each of the images plotted accurately to the tuning page regardless of the orientation of the publication 1 as shown in FIG. 11.

In providing this page-turn, the preferred embodiment of this invention incorporates the entire page-turn animation and its 3-dimensioanl nature into a program to run on a personal computer or similar to display such a publication. Preferably, the program is written in assembly code due to the high number of calculations required to accurately calculate the colours of pixels in remapping the information to the turning page. Such calculations may prove too time consuming in higher-level languages.

Figure 12:
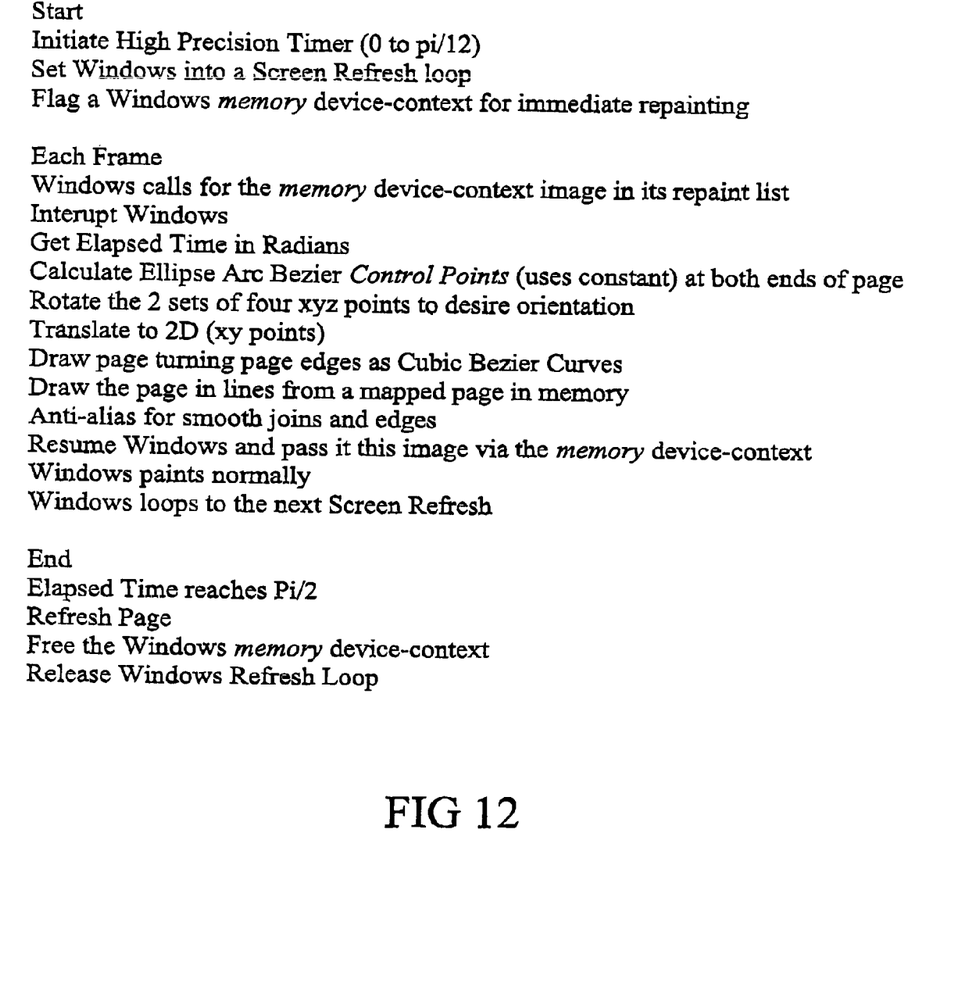
FIG. 12 shows a flow chart of the operations of the steps of a program to implement a preferred embodiment of the invention.

The basic processes of the program can be seen in FIG. 12.

The process may start when a user initiates a page-turn by some form of suitable controls such as use of a mouse or any form of virtual reality tool. From the moment the page-turn request is made, a 64 bit high resolution timer may be initiated so that the program may control the page-turn such that the page-turn is completed in a predetermined time and the animations are accurately placed regardless of intermediate intervals in time between specific frames.

Having started the timer, this program is intended to operating conjunction with Microsoft Windows by setting Windows into a screen refresh loop. Windows does not execute this loop in a consistent time interval and it is only once the loop reaches a flag in a Windows memory device context requiring a media repainting at the specific frame to be painted is then calculated.

Once Windows has requested information from the program concerning the repainting, the program interrupts Windows and determines the elapsed time from the time in terms of radians of a value between 0 and pi/2 to determine how far the page has turned in calculating the single frame.

The page-turn box 12 and its corners including the page-turn arc control points 23 and 24 may be calculated and, by knowing the semi-major and semi-minor axes links 27 and 28 of the ellipse of the turning page from the known elapsed time as shown in FIG. 7, it is possible to calculate the position of the page edge bezier control points 21 and 22 as shown in FIG. 8 for both sides of the page.

The x and y points together with the said component has determined by the page-turn cage itself for the start point, end point and two bezier control points for each curved page edge of the turning page are then known and translated back to two dimensions as defined previously.

At this point it is possible to draw the edge of the turning page using the formula for the cubic bezier curves provided previously where t is a proportion of the distance along each of the curves between a value of 0 and 1 being the end of the curve.

The page lines may be drawn in and antialiased by averaging values across adjacent pixels to smooth joints and edges.

It is then possible to resume Windows and pass this image via the memory device context and Windows will repaint the screen normally. Windows may then loop to the next screen refresh.

Once the elapsed time from the 64-bit high-resolution timer has reached the predetermined value for completion of the page-turn, the publication is now again lining flat awaiting the next command for turning of a page. Windows may be free from the memory device context and the Windows refresh loop released.

In mapping the actual origin page containing all the information of the text and images 4 the turning page to the turning page 5 may be performed, in a preferred embodiment, by constructing substantially vertical lines down the page between the two elliptical edges 36 and 37. In practice, this is performed as the page edges themselves are constructed. Furthermore, this calculation may be performed to a suffix or level to provide significantly sharper lines and images throughout the publication.

As an example of how this may be performed, we can perhaps consider the origin page when the page is lining flat to be, purely by example, 20 pixels wide. Of course, in practice, the pages many many times the size.

Upon translation of the critical points of the publication to the page-turn cage, drawing of the turning page is performed by the formula provided previously for drawing a cubic bezier curve. Commencing from the spine of the publication and using this as the bezier curve start point, t in the equation may be incremented on each of the outer curves 36 and 37 of the turning page and pixel colour values plotted down the turning page to complete the image. If it is wished to provide a sharper image to a suffix or level in the example as mentioned, rather than taking each pixel colour value in its entirety from the origin page and trying to plot this to a suitable number of pixels on the turning page, t may be taken as being, for example, 16 times the number of increments of the pixels so that the resolution is to a $16^{th}$ of a pixel. Instead of t plotting 20 points along the elliptic curves 36 and 37, t may be made equal to one over 320, two over 320, three over 320, etc. The colour value of each pixel from the origin page may be suitably divided by 16 in performing this plotting.

Additionally, it will be appreciated that a single pixel from the origin page no longer equates to the exact size of a pixel on the turning page in its final orientation. A single pixel from the origin page may be spread over a number of pixels in the destination page due to the expansion of the page towards the user in the turning motion. Similarly, a single pixel from the origin page may form only a fraction of a pixel on the destination page. At each increment of t in the bezier curve equations to construct the elliptic curves 36 and 37, a $16^{th}$ of the colour value of a pixel from the origin page may be mapped against anyone or more pixels on the destination page to which it would map. It should be noted this also includes some expansion towards the user of the pixels from the origin page from the elliptic curve 36 to the elliptic curve 37 due to the perspective nature of the view of the publication. Once sufficient increments of t have been completed to have mapped all relevant portions of the orientation page to a pixel on the destination page, this pixel may be mapped to the final image with the colours averaged and antialiased as desired.

It should be noted that this is only one possible method of mapping the images on the origin page to the destination page 5. However, this method allows a high degree of position to be maintained on the image on the curved page for that particular frame of the animation.

It should also be noted that, in taking the calculations to a suffix or level, the use of portions of a pixel in terms of $16^{th}$ is merely a preferential choice. The use of a figure that is a power of 2 such as 2, 4, 8, 16, 32 is advantageous in performing quick calculations due to the ability to shift numerical numbers in registers to multiply or divide by such numbers.

Thus it can be seen that this invention provides a 3-dimensional publication which can be redrawn to any orientation and indeed the orientation of the publication may change between one frame of the animation to another. The orientation of the user in relation to the publication is considered in the repaint of each frame of the animation so that a turning page may move fluently from one side of the publication to the other even as a user moves around the publication in 3-dimensional space.

Although calculations for the page-turn would be substantially simplified by turning the page as a flagged page, the use of an elliptic curve provides a far more visually realistic turning page and the definition of the elliptic curve in terms of bezier control points allows easy manipulation of those curves in 3-dimensional space and its remapping to a 2-dimensional screen.

Although this invention has been described in terms of its preferred embodiment, those skilled in the art to which the invention relates will understand that the description of the preferred embodiment should not be considered limiting to the scope of the invention as defined by the appended claims. Various integers described in the preferred embodiment are deemed to incorporate known equivalents where appropriate.

The invention claimed is:

1. A method of providing a user interface including a 2-dimensional representation of a 3-dimensional multiple-page document having a page-turn comprising:
    displaying said multiple-page document on a 2-dimensional display to a user;
    detecting a request from a user for a subsequent page from said multiple-page document;
    displaying an animated sequence of frames throughout the transition between said first and subsequent pages to create a page-turn; and
    wherein said publication is redrawn to accommodate any change in orientation by the user intermediate of frames in said animated sequence.

2. The method of providing a user interface as claimed in claim 1 wherein said method further includes the steps of:
    representing the multiple-page document and the position of the turning page by means of characteristic points around or about said document;

orientating said characteristic points in terms of the position of a user;

translating said points to the 2-dimensional display; and drawing at least an outline of said publication with respect to said translated characteristic points.

3. The method of providing a user interface as claimed in claim 2 wherein said characteristic points include bezier control points corresponding to the position of said turning page.

4. The method of providing a user interface as claimed in claim 2 wherein said characteristic points include bezier control points relating to the arc through which an outer edge of said tuning page may translate.

5. The method of providing a user interface as claimed in claim 1 wherein said turning page includes curvature in the plane of the turning page.

6. The method of providing a user interface as claimed in claim 5 wherein a turning page, if viewed in cross section through the page, assumes a substantially elliptical curve from an edge adjacent a spine of said multi-page document towards an outer edge distal from said spine.

7. A method of displaying an animation frame of a publication with a partially turned page on a display means comprising the steps of:

determining the rotation of the partially turned page with respect to a reference point for the publication;

characterising the publication and the partially turned page with characteristic points referenced to a point of rotation;

orientating the characteristic points about the point of rotation with reference to the position of a user;

translating the rotated characteristic points to the display means; and drawing the frame of the animation of the publication with reference to the translated rotated characteristic points.

8. The method of displaying an animation frame of a publication with a partially turned page on a display means as claimed in claim 7 wherein said partially turned page includes curvature in the plane of the turning page.

9. The method of displaying an animation frame of a publication with a partially turned page on a display means as claimed in claim 8 wherein said partially turned page, if viewed in cross section through the page, assumes a substantially elliptical curve from an edge adjacent a spine of said multi-page document towards an outer edge distal from said spine.

10. The method of displaying an animation frame of a publication with a partially turned page on a display means as claimed in claim 7 wherein said characteristic points include bezier control points corresponding to the position of the partially turned page.

11. The method of displaying an animation frame of a publication with a partially turned page on a display means as claimed in claim 7 wherein said characteristic points include bezier control points relating to the arc through which an outer edge of said partially turned page may translate.

12. A user interface including a 2-dimensional representation of a 3-dimensional multiple-page document having a page-turn comprising:

a 2-dimensional display for displaying said multiple-page document to a user;

means for detecting a request from a user for a subsequent page from said multiple-page document;

means for calculating an animated sequence of frames throughout the transition between said first and subsequent pages to create a page-turn; and wherein said means for calculating a frame of said animation accommodates any change in orientation by the user intermediate of frames in said animated sequence.

13. The user interface including a 2-dimensional representation of a 3-dimensional multiple-page document have a page-turn as claimed in claim 12 wherein said means for calculating a frame of said animation further includes:

means to assign characteristic points around or about said document to represent the multiple-page document and the position of the turning page;

means to calculate the orientation of said characteristic points in terms of the position of a user;

means to calculate the translation of said points to the 2-dimensional display; and means to draw at least an outline of said publication with respect to said translated characteristic points.

14. The user interface including a 2-dimensional representation of a 3-dimensional multiple-page document have a page-turn as claimed in claim 13 wherein said characteristic points include bezier control points corresponding to the position of said turning page.

15. The user interface including a 2-dimensional representation of a 3-dimensional multiple-page document have a page-turn as claimed in claim 13 wherein said characteristic points include bezier control points relating to the arc through which an outer edge of said turning page may translate.

16. The user interface including a 2-dimensional representation of a 3-dimensional multiple-page document have a page-turn as claimed in claim 12 wherein said turning page includes curvature in the plane of the turning page.

17. The user interface including a 2-dimensional representation of a 3-dimensional multiple-page document have a page-turn as claimed in claim 16 wherein a turning page, if viewed in cross section through the page, assumes a substantially elliptical curve from an edge adjacent a spine of said multi-page document towards an outer edge distal from said spine.

18. A user interface for displaying an animation fame of a publication with a partially turned page on a display means comprising:

means for determining the rotation of the partially turned page with respect to a reference point for the publication;

means for characterising the publication and the partially turned page with characteristic points referenced to a point of rotation;

means for orientating the characteristic points about the point of rotation with reference to the position of a user;

means for translating the rotated characteristic points to the display means; and means for drawing the frame of the animation of the publication with reference to the translated rotated characteristic points.

19. The user interface for displaying an animation frame of a publication with a partially turned page on a display means as claimed in claim 18 wherein said partially turned page includes curvature in the plane of the turning page.

20. The user interface for displaying an animation frame of a publication with a partially turned page on a display means as claimed in claim 19 wherein said partially turned page, if viewed in cross section through the page, assumes a substantially elliptical curve from an edge adjacent a spine of said multi-page document towards an outer edge distal from said spine.

21. The user interface for displaying an animation frame of a publication with a partially turned page on a display means as claimed in claim 18 wherein said characteristic points include bezier control points corresponding to the position of the partially turned page.

22. The user interface for displaying an animation frame of a publication with a partially turned page on a display means as claimed in claim 18 wherein said characteristic points include bezier control points relating to the arc through which an outer edge of said partially turned page may translate.

\* \* \* \* \*